US012213035B1

(12) United States Patent
Lan (10) Patent No.: US 12,213,035 B1
(45) Date of Patent: Jan. 28, 2025

(54) USER EQUIPMENT BAROMETER CALIBRATION OVER TIME

(71) Applicant: T-Mobile USA, Inc., Bellevue, WA (US)

(72) Inventor: Wei-Ming Lan, Morrisville, NC (US)

(73) Assignee: T-Mobile USA, Inc., Bellevue, WA (US)

( * ) Notice: Subject to any disclaimer, the term of this patent is extended or adjusted under 35 U.S.C. 154(b) by 643 days.

(21) Appl. No.: 17/380,294

(22) Filed: Jul. 20, 2021

(51) Int. Cl.
*H04W 4/38* (2018.01)
*G01W 1/02* (2006.01)
*H04W 4/029* (2018.01)

(52) U.S. Cl.
CPC .............. *H04W 4/38* (2018.02); *G01W 1/02* (2013.01); *H04W 4/029* (2018.02)

(58) Field of Classification Search
CPC ....... H04W 4/029; H04W 4/02; H04W 4/025; H04W 4/33; H04W 4/80; H04W 64/00; H04W 84/12; H04W 4/38; H04W 52/0254
USPC ....... 370/329, 352, 395, 328, 241, 252, 254, 370/311, 503, 235, 312
See application file for complete search history.

(56) References Cited

U.S. PATENT DOCUMENTS

| | | | | |
|---|---|---|---|---|
| 7,542,852 B1 * | 6/2009 | Rose | ................. | G01W 1/10 73/170.16 |
| 2005/0137835 A1 * | 6/2005 | Moessner | ............. | G06Q 10/04 702/193 |
| 2014/0172351 A1 * | 6/2014 | Barfield | ................. | G01C 5/06 702/138 |
| 2015/0127287 A1 | 5/2015 | Wolf | | |
| 2015/0192414 A1 * | 7/2015 | Das | .......... | G01C 5/06 73/384 |
| 2016/0259062 A1 * | 9/2016 | Raghupathy | ............ | G01S 19/48 |
| 2018/0075546 A1 * | 3/2018 | Richt | ..................... | G06T 1/0007 |
| 2019/0025786 A1 * | 1/2019 | Park | .................. | G05B 23/0264 |
| 2019/0097904 A1 * | 3/2019 | Park | ...................... | H04L 43/045 |
| 2020/0322753 A1 * | 10/2020 | Robertson | ............. | H04W 4/023 |
| 2021/0172736 A1 * | 6/2021 | Ivanov | .................. | H04W 4/029 |
| 2022/0205861 A1 | 6/2022 | Li | | |

(Continued)

OTHER PUBLICATIONS

Office Action for U.S. Appl. No. 17/380,306, mailed on Apr. 5, 2023, Wei-Ming Lan, "User Equipment Barometer Calibration Enclosure and Method", 20 pages.

(Continued)

*Primary Examiner* — Joseph Arevalo
(74) *Attorney, Agent, or Firm* — Lee & Hayes, P.C.

(57) ABSTRACT

Techniques for calibrating a barometer sensor of a user equipment over time are discussed herein. In some cases, the accuracy of the barometer sensor may degrade over time. Techniques can include determining that the UE is at a consistent location over time. When the UE is at the location, the sensor data can be captured over time and stored. Data can be grouped by time periods (e.g., weekly, monthly, etc.) and a metric, such as an average value, can be determined. Over time, metrics can be compared to determine a drift in sensor accuracy. Differences in metrics can be used to determine calibration data, such as an offset, to calibrate subsequent sensor data. The offset can be applied to later-captured sensor data to provide more accurate data, which can ultimately result in more a more accurate determination of an elevation of the UE.

17 Claims, 5 Drawing Sheets

(56) References Cited

U.S. PATENT DOCUMENTS

2022/0374458 A1   11/2022   Cho et al.

OTHER PUBLICATIONS

Office Action for U.S. Appl. No. 17/380,306, mailed on Dec. 16, 2022, Wei-Ming Lan, "User Equipment Barometer Calibration Enclosure and Method", 16 pages.

\* cited by examiner

USER EQUIPMENT BAROMETER CALIBRATION OVER TIME

BACKGROUND

The ability to access emergency response services by dialing a reserved emergency telephone number, such as 911 in the United States, is a vital component of public safety and emergency preparedness. In the United States, the Federal Communications Commission (FCC) has established a set of rules and regulations that require mobile communication providers to deliver enhanced emergency services to their subscribers. In particular, mobile communication providers are required to provide a current location of a 911 caller to emergency services. In particular, PS Docket No. 07-114 mandates a particular z-axis (vertical) location accuracy for indoor wireless e911 calls.

There are also many other situations where it is useful to know the location of a device. For example, certain device applications may provide services that depend on device location. As another example, advertising may be tailored to the current location of a device user.

In some cases, the location of a mobile device can be determined and reported by the mobile device itself, based on global positioning system (GPS) data. In these cases, the mobile device provides geographical coordinates of its location to the mobile communication provider. The mobile communication provider or associated entities can use this information to determine a street address, and may provide the street address to emergency services. However, GPS is not always accurate, particularly in locations with poor visibility of the sky, such as many cities.

Further, a mobile device may use data from other sensors to determine the elevation of the mobile device in an environment. However, other sensors, such as a barometer, may suffer from low accuracy as well.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for calibrating a barometer sensor of a user equipment over time are discussed herein. In some cases, before a user equipment leaves the factory or is purchased by a user, a barometer sensor is often calibrated to accurately captured sensor data of an environment. However, in some cases, the accuracy of the barometer sensor may degrade over time, due to physical characteristics or other reasons. Calibration techniques can include establishing a calibration location, such as a home location of a user. Techniques can include determining that the UE is at the calibration location and capturing sensor data (e.g., barometer sensor data, temperature data, humidity data, etc.). Sensor data can be captured over time when the UE is determined to be at the calibration location. Data captured over time can be grouped (e.g., weekly, monthly, etc.) and a metric can be determined. In some cases, the metric may be an average sensor reading, which may be indexed by temperature. As sensor data is captured over time, metrics can be compared to determine trends indicative of a drift in sensor accuracy. If a difference between metrics is above a threshold, the UE can perform additional calibration operations (e.g., comparing UE captured sensor data with a more accurate sensor) or can determine calibration data, such as an offset, to calibrate subsequent sensor data. When the UE captures barometer sensor data, the calibration data can be applied to the data to provide more accurate data, which can ultimately result in more a more accurate determination of an elevation of the UE.

In some examples, the UE can determine a calibration location explicitly via input from a user or implicitly via heuristics or a machine learned model. In a case where the calibration location is determined explicitly, the UE can present a prompt or an indication on a user interface and a user may confirm that the UE is at a specific calibration location, such as a location where the UE is placed at night. In a case where the calibration location is determined implicitly, the UE may infer a calibration location based on a number of factors, such as a connection to a Wi-Fi base station (or other access point), a signal characteristics of the connection, visible base station identifiers (e.g., SSIDs, whether connected to or not), connection to a Fourth Generation or Fifth Generation base station and signal characteristics thereof, GPS data, accelerometer data, a state of the UE (e.g., night time mode), acceleration data (e.g., accelerometer data indicative of movement over a period of time), a time of data (e.g., late night or early morning when a user is typically sleeping), and the like. In some examples, the factors (e.g., data) can be evaluated using heuristics or rules or can be input to a machine learned model trained to determine whether the UE is at the calibration location.

For example, techniques can include determining that the UE is connected to a known base station, a current time, a current temperature, and/or accelerometer data, and can input the factors into a machine learned model. Based on the input, the machine learned model can output an indication that the machine learned model is at the location. In some examples, feedback can be provided or more data can be obtained to verify the location of the UE, which can improve the confidence of the machine learned model that the device is at the location (e.g., the calibration location).

If the UE is at a calibration location, the sensor data (e.g., pressure data, temperature data, and the like) can be captured. In some examples, the techniques can include presenting an indication to the user asking the user to confirm whether the UE is at the calibration location. In some examples, the indication can be presented based at least in part on a confidence (e.g., confidence level, confidence value, probability of being at the calibration location, etc.) that the UE is at the calibration location. In some examples, if the UE is determined not to be at the calibration location, or a confidence of the UE being at the calibration location is below a threshold, the UE can refrain from capturing sensor data or can discard sensor data if it is captured.

In some examples, sensor data captured over time can be grouped (e.g., by time period) or otherwise organized into subsets of sensor data. For example, sensor data can be grouped weekly, monthly, or over any period of time. Metrics can be determined for groups and can be compared to determine differences or trends in the data. For example, metrics can include, but are not limited to, an average, a range (e.g., between maximum and minimum values), standard deviation, a number of samples, slope (e.g., of data in the group), and the like. In some examples, the metrics can be associated with other data such as temperature, humidity, and the like. In some examples, data in groups can be indexed by temperature and/or metrics can be determined for barometer sensor data captured at similar temperatures.

In some examples, differences between metrics for different groups can be determined. For examples, an average barometer reading for a first group may be a first value (e.g., 101.325 kilo Pascals (kPa)) while an average barometer reading for a second group may be a second value (e.g., 101.288 kPa). If the metrics are determined to be associated with the same calibration location, the difference (e.g., ~36 Pa) can be used to determined calibration data to be applied to subsequently captured barometer sensor data. For example, when barometer sensor data is captured, an offset of 3 meters can be applied to the barometer data to adjust the calibration data (e.g., in this example, downwards by 3 meters). Of course, the calibration data may vary depending on the exact characteristics of the sensor and based on the results of the calibration process. In some examples, the calibration data may be represented as adjustments to an elevation (e.g., in meters) rather than as an adjustment to a pressure reading (e.g., in Pascals).

As noted above, the calibration techniques discussed herein can be used in UEs such as smartphones to provide more accurate location information of the UE. Accordingly, the techniques discussed herein improve the functioning of a computing device by calibrating sensors to provide more accurate measurements. In the context of enhanced 911 (e911) services, more accurate barometer readings may facilitate first responders more quickly locating a source of an emergency call.

In some examples, a UE can include a calibration application or driver that can implement the calibration procedures over time. The calibration data can be stored in the UE and accessed by the UE in response to a request to elevation data. For example, the UE can receive a request for an elevation of the UE. In some examples, the request can be associated with a communication to a Public Safety Answering Point (PSAP). In response to the request, the UE can capture sensor data using the barometer sensor of the UE and can access the calibration to determine an elevation of the UE. For example, depending on the calibration data, the UE may increase, decrease, or may not change the adjusted pressure (and accordingly the determined elevation of the UE). The UE can provide elevation data (based on the calibration data) in response to the request.

The techniques discussed herein can be implemented in the context of protocols associated with one or more of 3G, 4G, 4G LTE, and/or 5G protocols. Further, although discussed in the context of UEs and barometer sensors, the techniques can be used on a variety of devices and on a variety of sensors. For example, techniques can be used to calibrate temperature sensors, magnetic sensors, accelerometers, humidity sensors, cameras, lidar sensors, time of flight sensors, speedometers, and the like. Example implementations are provided below with reference to the following figures.

Figure 1:
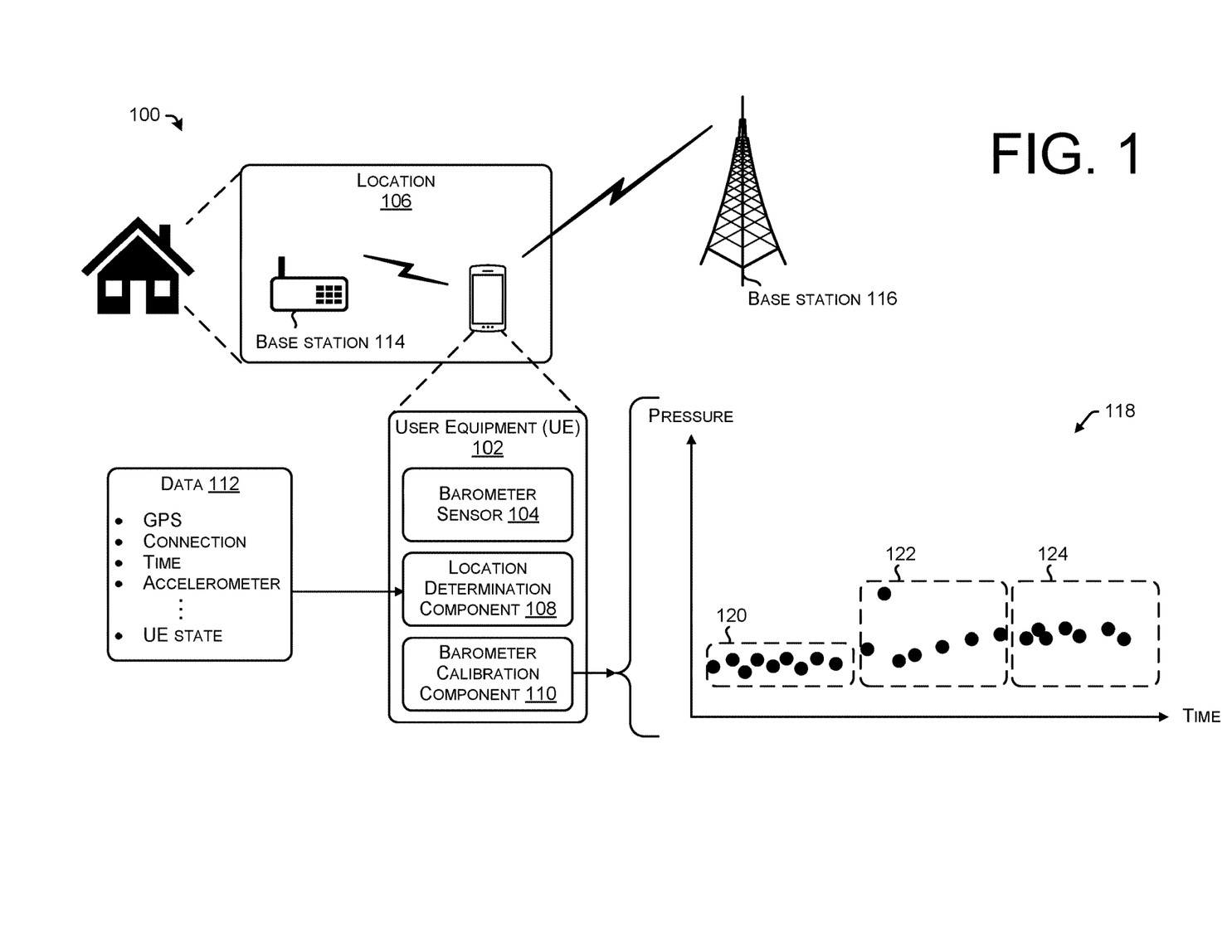
FIG. 1 shows an example system for calibrating a barometer of a user equipment (UE) over time.

FIG. 1 shows an example environment 100 for calibrating a barometer of a user equipment (UE) 102 over time. In some examples, the UE 102 can include a barometer sensor 104 for determining a pressure in any environment associated with the UE 102. As mentioned above, and in some examples, before the UE 102 leaves the factory or is purchased by a user, the barometer sensor 104 is often calibrated to accurately captured sensor data of an environment. However, in some cases, the accuracy of the barometer sensor 104 may degrade over time, due to physical characteristics or other reasons. Accordingly, calibration techniques can include establishing a calibration location, such as a location 106 (e.g., a home of a user).

The UE 102 can include a location determination component 108 and a barometer calibration component 110 for calibrating the barometer sensor 104, as discussed herein.

In some examples, the UE 102 can be any device that can wirelessly connect to a telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

In general, the location determination component 108 can determine a location of the UE 102. More particularly, the location determination component 108 can receive data 112 to determine that the UE 102 is at a calibration location (e.g., the location 106). For example, the data 112 can include, but is not limited to, one or more of GPS data, connection information, time of day, accelerometer information, UE state information, and the like. In some examples, GPS data can include a current GPS location or previous GPS information combined with additional accelerometer data to determine a location of the UE 102. In some examples, connection information can include a status of a communication with a base station (e.g., a base station 114 or a base station 116). The base station 114 can represent a Wi-Fi base station associated with the location 106, such as a user's router. The base station 116 can represent an eNodeB or a gNodeB, as examples.

In some examples, a time of day can include the current time associated with capturing or sampling data from the barometer sensor 104. For example, the time information can include a general or specific time of day by when a user is expected (e.g., learned or otherwise determined) to be at the calibration location. In some examples, the time may be an early morning period (e.g., 1:00 am) such that a user is likely to be sleeping in their bed, based on an assumption that the UE 102 is likely to be at a same location at the same time.

In some examples, accelerometer data can include information about motion of the UE 102 over time. In some cases, the accelerometer data, combined with the time of data and/or connection information, can provide an indication that the UE 102 is connected to the base station 114, the UE 102 has not been moved for a period of time (e.g., several hours), the time of day is when the user is likely sleeping, and the like, which can suggest a UE 102 is at a calibration location. In some examples, as more of the data 112 can be determined and input to the location determination component 108, the location determination component 108 can determine with a higher likelihood (or confidence level) that the UE 102 is at the location 106 for capturing data using the barometer sensor 104.

Further, the UE state data can include information about the state of the UE, such as the orientation of the UE (screen up or down), whether the screen is on or off, applications that are or are not running, whether the user is interacting with the UE, whether the UE is charging or a charge status, and the like. Such information can provide further information to the location determination component 108 regarding the location of the UE 102.

In some examples the location determination component 108 can receive the data 112 to determine whether the UE 102 is at the location 106. In some examples, the location determination component 108 can determine, based on the data 112, a confidence level regarding the determination of whether the UE 102 is at the location. In some examples, the location determination component 108 can include heuristics and/or machine learned models to determine whether the UE 102 is at the location 106 (e.g., the calibration location) and/or a confidence level associated with that determination. As can be understood, some or all of the data 112 may be received by the location determination component 108. That is, not all of the data 112 is required in order to make a determination of a location.

In some examples, the location determination component 108 may further receive barometer data, temperature data, humidity data, and the like in determining whether the UE 102 is at the location. For example, the location determination component 108 can compare current barometer data to historical barometer data and determine that the UE 102 is not at the location, or, if the UE 102 is connected to the base station 114 (e.g., indicating that the UE 102 is likely at the location 106) but a difference between sampled barometer sensor data and historical data is beyond a threshold, the location determination component 108 may determine that the UE 102 is at the location 106 but can indicate a low confidence level, which may be considered in determining calibration information, as discussed herein.

By way of another example, in some cases the location determination component 108 determine a location based on information received from a base station. For example, the location determination component 108 can send a request for location information to the base station, which may have accurate location data of where the base station is located. Further the location determination component 108 can determine an approximate location of the UE 102 based on the coverage area of the particular base station. For example, if a base station is considered to be a microcell and location information is received from the base station, the location can be determined to be within that coverage area and/or a confidence level of the location can be increased relative to an example if a base station is a macrocell. In some examples, a location can be determined based at least in part on timing advance data, beam forming or beam triangulation, a direction of a beam from a base station, and the like.

In some examples, the location determination component 108 can provide an indication of the location to the barometer calibration component 110 (and the confidence level). At least partially in response to the UE 102 being at the location 106 (and receiving the indication of the location from the location determination component 108), the barometer calibration component 110 can capture barometer sensor data from the barometer sensor 104, temperature data, humidity data, and the like.

An example 108 illustrates barometer sensor data captured over time. As illustrated, the example 108 include a first group 120, a second group 122, and a third group 124, where each group represents sensor data captured over a period of time. In some examples, a group may be referred to as a subset of data, a plurality of sensor data, and the like. In some examples, the groups 120, 122, and/or 124 may represent any regular or irregular intervals of time. In some examples, the groups 120, 122, and 124 may represent the same period of time or different periods of time. There may be any number of groups and the techniques are not limited to three groups as illustrated herein.

The barometer calibration component 110 can capture sensor data over time and can perform data processing to determine metrics associated with one or more groups. For example, the barometer calibration component 110 can determine an average barometer reading for a group and can determine that the average is changing over time. In some examples, a difference between a first group and a second group may represent a drift in the accuracy of the barometer sensor 104 and the difference can be used to determine calibration data. For example, the difference can be used to determine offset information, which can be applied to subsequently captured sensor data to adjust the sensor data to a more accurate value. Additional details of metrics and data processing are discussed in connection with FIG. 2, as well as throughout this disclosure.

Figure 2:
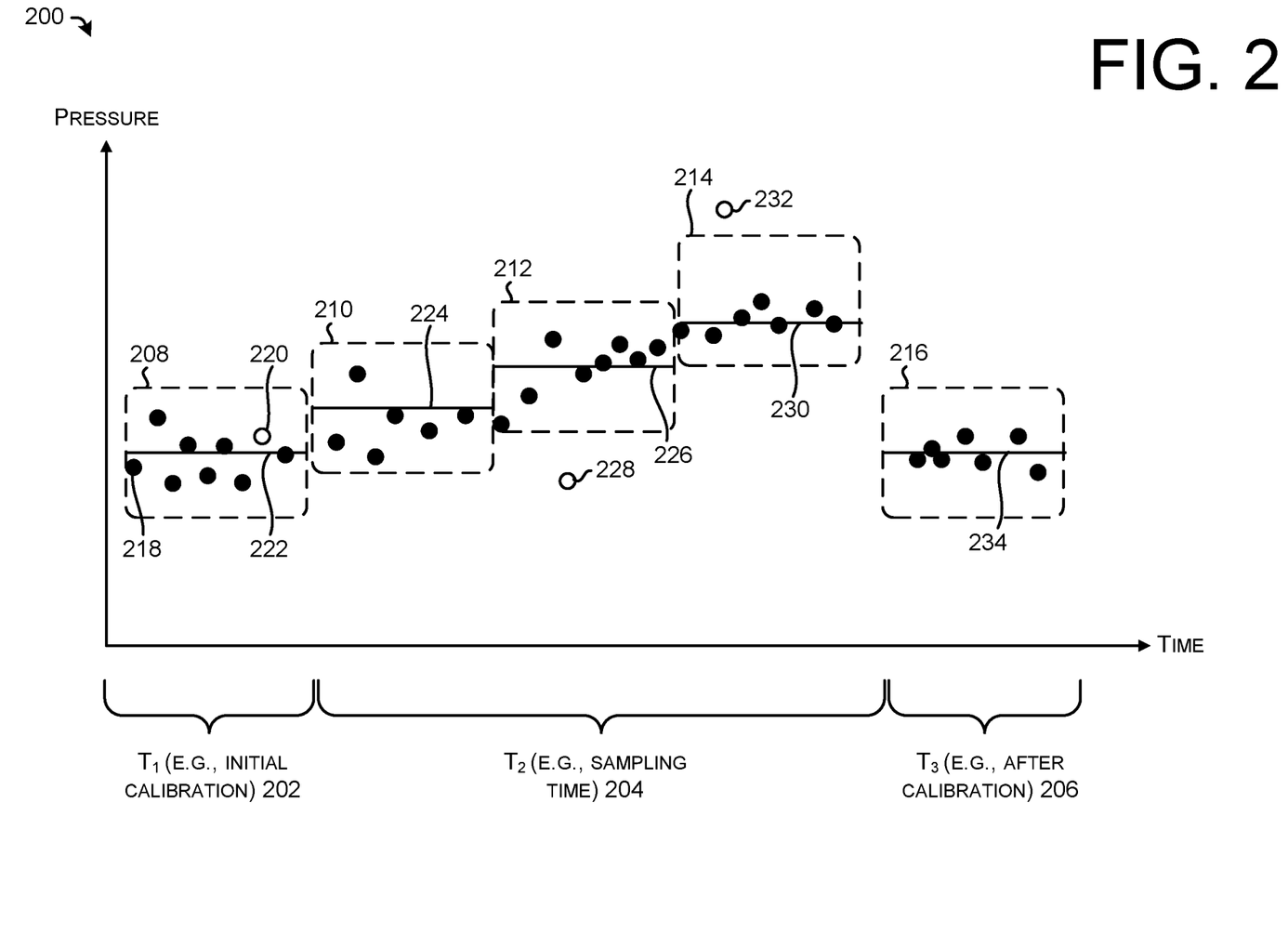
FIG. 2 shows an example of barometer data for a UE throughout the calibration process and after calibration, as discussed herein.

FIG. 2 shows an example 200 of barometer data for a UE throughout the calibration process and after calibration, as discussed herein.

For example, the time period $T_1$ 202 represents a period of time after an initial calibration or after a recalibration procedure. For example, this time period may be based on an initial manufacture date and/or based on manufacturer data indicative of an accuracy of a barometer sensor over the period of time. In some examples, the calibration location can be determined (at least in part) during the time period $T_1$ 202. Baseline barometer data, temperature data, humidity data, etc. can be established or otherwise determined in the time period $T_1$ 202.

The time period $T_2$ 204 represents a sampling time during which the location of a UE can be determined and barometer data, temperature data, pressure data, and the like can be determined from an environment. Using the techniques discussed in connection with FIG. 1, and throughout the disclosure, the data captured in the time period $T_2$ 204 can represent sensor data captured at a consistent calibration location.

The time period $T_3$ 206 represents a time after calibration data has been determined and applied to subsequent barometer sensor data.

Further, the example 200 illustrates groups 208, 210, 212, 214, and 216, which may represent a plurality of sensor data captured over a period of time. For example, each group 208-216 may represent a discrete portion of time, such as one week, one month, two months, and the like. Of course, the example 200 may illustrate any number of time periods and any number of groups associated with the time periods. Further, the techniques associated with the example 200 may be repeated as needed to ensure the accuracy of a barometer sensor over time.

As noted above, the group 208 is associated with the first period of time 202 and is associated with an initial calibration of a barometer sensor associated with the UE. Data samples in the group 208 represent the baseline or ground truth for determining changes in the accuracy of a barometer sensor. A first data sample is illustrated as a data point 218 and a second data sample is illustrated as a data point 220.

The data point 220 is illustrated as a circle with a black border and a white interior, which may represent data with a low confidence level or a data point that is discarded for the purposes of determining a metric 222. By way of example and without limitation, the confidence level of the data point 220 may be low if the location determination component 108 determined the location with a relatively low accuracy. The data point 118 is illustrated as a circle with a black border and a black interior, which may represent data with a high confidence level or a data point that is used to determine the metric 222.

In some cases, the metric 222 can represent an average pressure reading for the data associated with the group 208. Further, the metric can include, but is not limited to, an overall confidence level associated with the metric (e.g., an average of the confidence levels of the data in the group 208), a standard deviation, a range (e.g., maximum and minimum), a slope (e.g., indicative of a trend over time within the group), temperature data (e.g., determining that the data used to determine the metric is within a threshold temperature), and the like.

Similarly, the group 210 is associated with a metric 224, which may represent similar data as the metric 222 but determined based on the data associated with the group 210.

The group 212 is associated with a metric 226, which may represent similar data as the metric 222 but determined based on the data associated with the group 212. In some cases, a data point 228 is illustrated as a circle with a black border and a white interior, which may represent data with a low confidence level or a data point that is discarded for the purposes of determining the metric 226. By way of example and without limitation, the confidence level of the data point 228 may be low if a difference between the metric 226 (or 224) and the pressure data of the data point 228 meets or exceeds a threshold pressure data, which may indicate an unreliable data reading.

The group 214 is associated with a metric 230, which may represent similar data as the metric 222 but determined based on the data associated with the group 214. In some cases, a data point 232 is illustrated as a circle with a black border and a white interior, which may represent data with a low confidence level or a data point that is discarded for the purposes of determining the metric 230. By way of example and without limitation, the confidence level of the data point 232 may be low if a difference between the metric 226 (or 224) and the pressure data of the data point 232 meets or exceeds a threshold pressure data, which may indicate an unreliable data reading.

After capturing data in the time period $T_2$ 204, the calibration techniques can analyze the data metrics 222, 224, 226, and/or 230 to determine a trend or differences from the metric in the second time period $T_2$ 204 and the metric 222 associated with the first time period $T_1$ 202. In the example 200 illustrated in FIG. 2, the data metrics 224, 226, and 230 represent higher average pressures than the metric 222. In some examples, this may represent a drift in the calibration of a barometer sensor, and the calibration techniques can include determining a difference between the metric 224, 226, and/or 230 and the metric 222 and determining calibration data based on the difference.

For example, if a difference between the metric 230 and the metric 222 exceeds a threshold value, calibration data may be determined based on the difference. In some examples, the threshold value can be determined based on an expected or observed noise of data in the group 208. For example, the threshold may be based on a standard deviation or some other statistically significant analysis of pressure data.

In some examples, the calibration data can be determined and applied to subsequently captured data. For example, data captured in the third time period $T_3$ 206 can be represented as data in the group 216. Data in the group 216 may represent calibrated sensor data. The techniques can include determining a metric 234, which can more accurately represent sensor data at the calibration location after calibration, as discussed herein.

In some examples, the differences or drift in the time period $T_2$ 204 can represent pressure variations over time. In some examples, the techniques can include indexing pressure data by temperature and/or determining that there is a sufficient amount of data (e.g., number of data points, length of time of the time period $T_2$ 204 meeting or exceeding a threshold period of time) prior to determining calibration data.

Of course, FIG. 2 illustrates but one example and the techniques discussed herein are not limited to the examples expressly illustrated.

Figure 3:
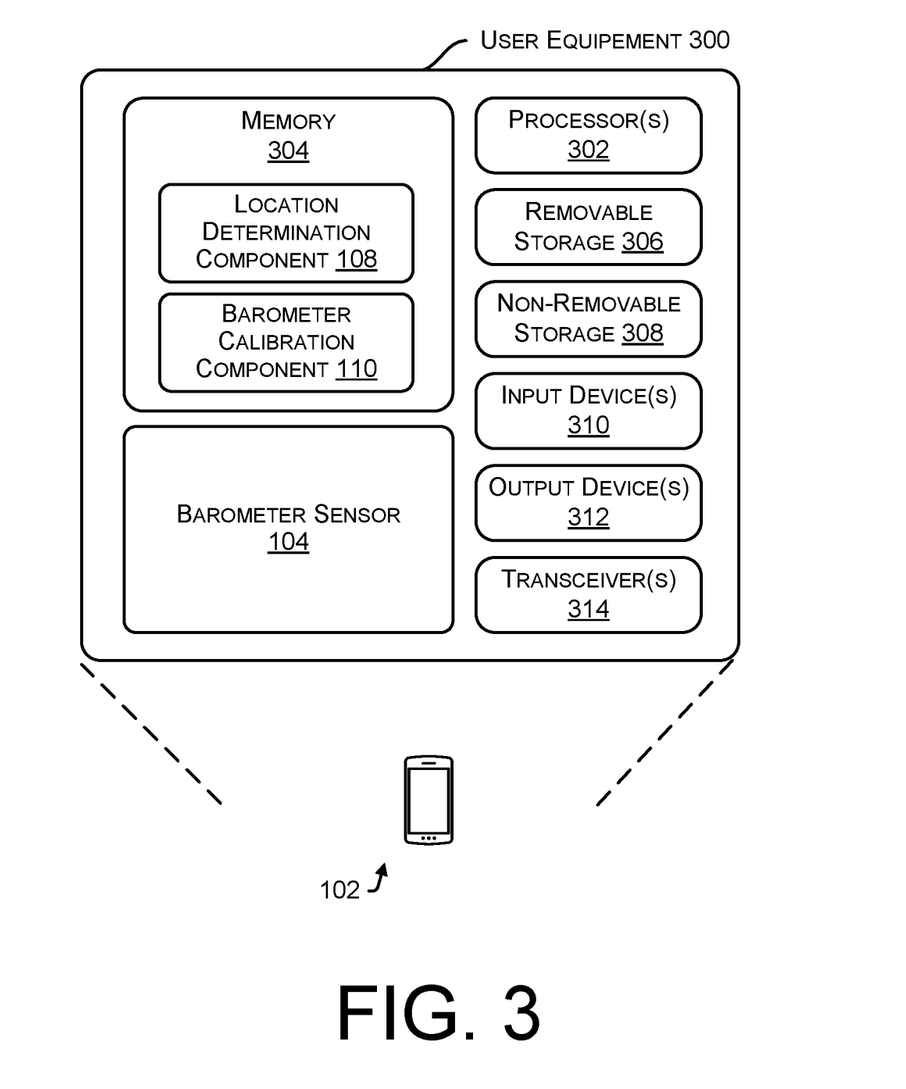
FIG. 3 is a block diagram of a device including components for calibrating a barometer sensor.

FIG. 3 is a block diagram of a device 300 including components for calibrating a barometer sensor. In some examples, the UE 300 (also referred to as a device 300) can be configured to implement some or all of the techniques discussed herein.

FIG. 3 shows basic, high-level components of the device 300. Generally, the device 300 may comprise and/or may be implemented in any of various network components discussed herein, including those components illustrated in FIG. 1.

In various examples, the device 300 may include processor(s) 302 and memory 304. Depending on the exact configuration and type of computing device, the memory 304 may be volatile (such as RAM), non-volatile (such as ROM, flash memory, etc.) or some combination of the two. The memory 304 may include the location determination component 108 and the barometer calibration component 110. The device 300 can also include the barometer sensor 104, as well as other sensors discussed herein.

In some examples, the location determination component 108 can include functionality to determine the location of the device 300 relative to a known location, such as a calibration location. As discussed herein, the location determination component 108 can determine a location explicitly (e.g., via the user confirming a location) or implicitly by inputting data representing various factors into heuristics, rules, or a machine learned model to determine a location of the device 300. In some examples, the location determination component 108 can determine a location based on a time of day, connection information (e.g., the device 300 being connected to a known base station, access point, etc.), GPS data, UE state information, and the like. Additional aspects of the location determination component are discussed throughout this disclosure.

In some examples, the barometer calibration component 110 can include functionality to calibrate the barometer sensor 104 of the device 300. As discussed herein, the barometer calibration component 110 can sample barometer data over time and can determine trends or metrics associated with the barometer sensor data. In some examples, the barometer calibration component 110 can determine a difference between a metric and an initial calibration baseline. In some examples, if there is a difference, the difference can represent an offset for calibrating subsequent barometer sensor data captured at the same or similar pressures.

In some examples, the location determination component 108 and/or the barometer calibration component 110 can include one or more machine learned models or heuristics that can be used to determine location data or calibration data, as discussed herein. For example, a machine learned model in the location determination component 108 and/or the barometer calibration component 110 can include weight(s) for various factors that can be used to estimate location and/or a calibration offset in response to capturing barometer sensor data.

For example, a machine learned model can be trained based on measured sensor data and ground truth data corresponding to the measured sensor data. The difference between the ground truth and the measured data can be used to train the model such that when a particular environmental condition is measured in the environment, the machine learned model can output i) a determination of whether the device 300 is at the calibration location (e.g., and a confidence level associated with such a determination) and/or ii) an offset value or a calibrated data value (e.g., either a calibrated pressure value or a calibrated elevation value).

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from the memory 304.

The memory 304 can also be described as non-transitory computer-readable media or machine-readable storage memory, and may include removable and non-removable media implemented in any method or technology for storage of information, such as computer executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 300 also includes additional data storage devices (removable and/or non-removable) such as, for example, magnetic disks, optical disks, or tape. Such additional storage is illustrated in FIG. 3 by removable storage 306 and non-removable storage 308. Tangible computer-readable media can include volatile and non-volatile, removable and non-removable media implemented in any method or technology for storage of information, such as computer readable instructions, data structures, program modules, or other data. The memory 304, the removable storage 306 and the non-removable storage 308 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The memory 304, the removable storage 306, and/or the non-removable storage 308 may in some cases include storage media used to transfer or distribute instructions, applications, and/or data. In some cases, the memory 304, the removable storage 306, and/or the non-removable storage 308 may include data storage that is accessed remotely, such as network-attached storage that the device 300 accesses over some type of data communications network.

In various examples, any or all of the memory 304, the removable storage 306, and/or the non-removable storage 308 may store programming instructions that, when executed, implement some or all of the function functionality described herein.

The device 300 also can include input device(s) 310, such as a keypad, a cursor control, a touch-sensitive display, voice input device, etc., and output device(s) 312 such as a display, speakers, printers, etc. These devices are well known in the art and need not be discussed at length here.

As illustrated in FIG. 3, the device 300 also includes one or more wired or wireless transceiver(s) 314. For example, the transceiver(s) 314 can include a network interface card (NIC), a network adapter, a LAN adapter, or a physical, virtual, or logical address to connect to various networks, devices, or components illustrated in figures herein. To increase throughput when exchanging wireless data, the transceiver(s) 314 can utilize multiple-input/multiple-output (MIMO) technology. The transceiver(s) 314 can comprise any sort of wireless transceivers capable of engaging in wireless, radio frequency (RF) communication. The transceiver(s) 314 can also include other wireless modems, such as a modem for engaging in Wi-Fi, WiMAX, Bluetooth, infrared communication, and the like.

Figure 4:
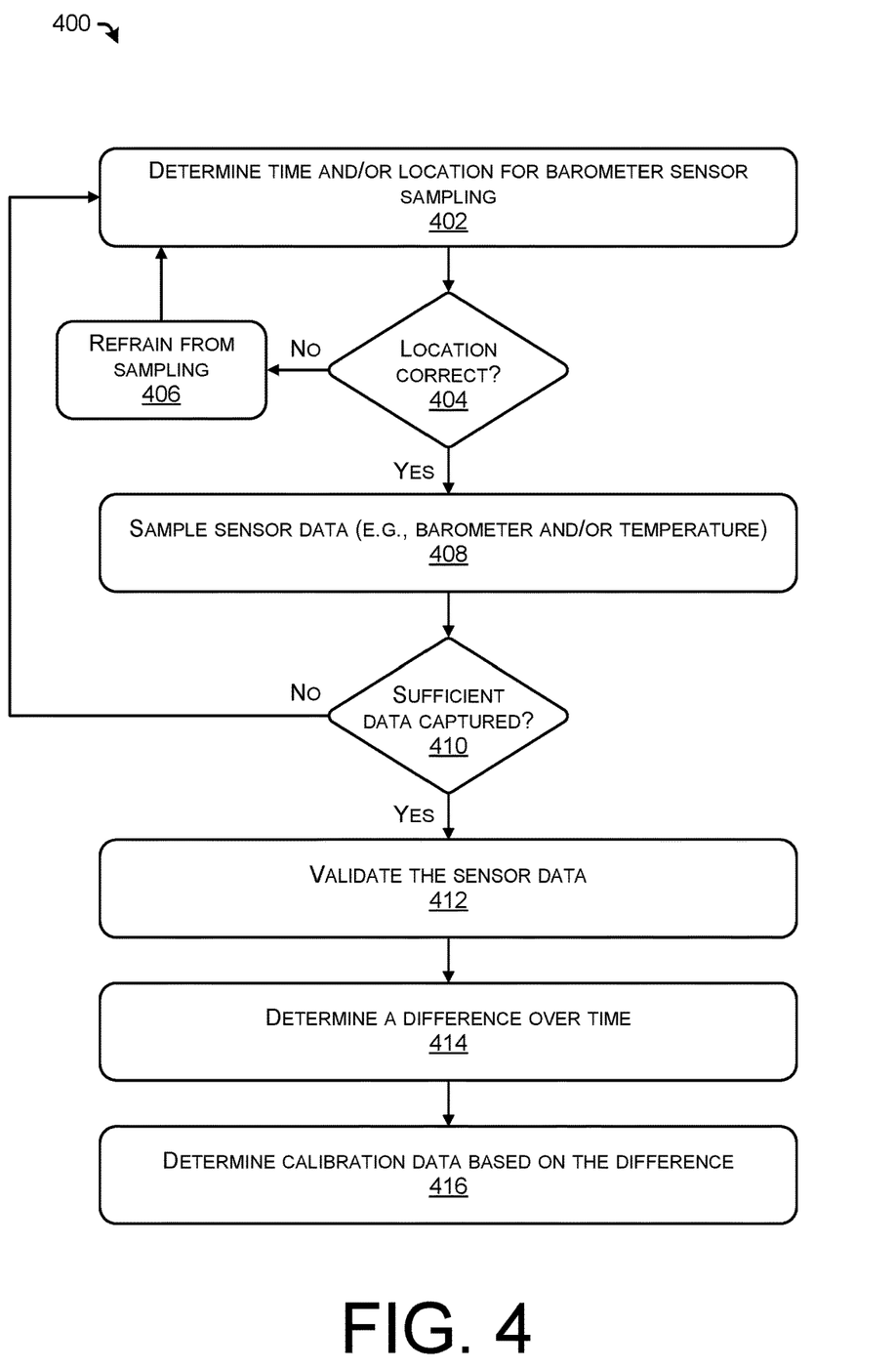
FIG. 4 shows an example process for a UE to perform a calibration procedure according to the techniques discussed herein.
Figure 5:
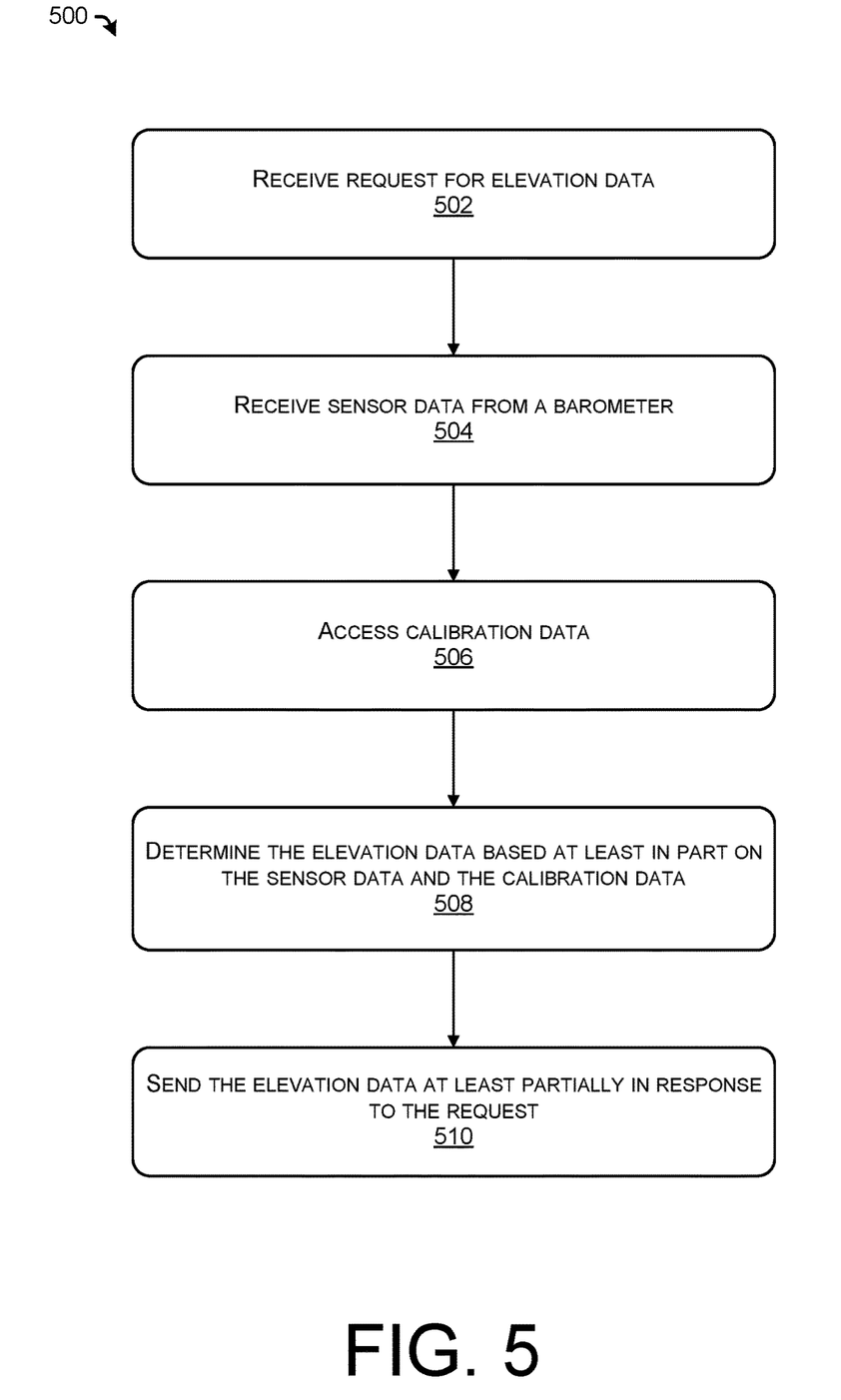
FIG. 5 illustrates an example process determining an elevation of a UE based on calibration data and sensor data captured by a barometer sensor.

FIGS. 4 and 5 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 4 shows an example process 400 for a UE to perform a calibration procedure according to the techniques discussed herein. The example process 400 can be performed (at least in part) by the UEs 102 and/or 300, or by any device comprising the location determination component 108 and/or the barometer calibration component 110, as discussed herein.

At operation 402, the process can include determining a time and/or a location for barometer sensor sampling. In some examples, the operation 402 can include establishing or otherwise determining a location for a calibration location. In some examples, the operation 402 can include explicitly or implicitly determining the location according to the techniques discussed herein. In some examples, the operation 402 can include determining the location of the UE after a calibration location is determined. For example, the operation 402 can include determining a current location of the UE in an environment.

At operation 404, the process can include determining whether a location of the UE is at the correct location (e.g., whether the UE is at the calibration location). In some examples, the operation 404 can include determining whether the UE is at a particular location at a particular time. If the UE is not at the location ("no" in operation 404) (or a confidence level of the UE being at the location is less than a threshold value), the process continues to operation 406, which includes refraining from sampling or otherwise capturing data. The process can return to the operation 402 for the location to be determined at another time, for example.

If the location of the UE is correct (e.g., "yes" in the operation 404) (or a confidence level of the UE being at the location meets or exceeds a threshold value), the process continues to the operation 408.

At operation 408, the process can include sampling sensor data, such as barometer data, temperature data, pressure data, and the like.

At operation 410, the process can include determining whether sufficient data has been captured. For example, the operation 410 can include capturing data in the second time period T2 204 of FIG. 2. As discussed above, in some examples, the calibration techniques may refrain from determining calibration location until a sufficient amount of data has been captured (e.g., a number of data points meets or exceeds a threshold) or a period of time for capturing sensor data has passed (e.g., a period of time of capturing sensor data meets or exceeds a threshold period of time).

If sufficient data has not been captured (e.g., "no" at operation 410) the process can return to the operation 402 to capture additional data. If sufficient data has been captured (e.g., "yes" at operation 410), the process continues to the operation 412.

At operation 412, the process can include validating the sensor data. For example, the operation 412 can include removing or ignoring data that can be considered unreliable. For example, data may be ignored or removed where a confidence level associated with the location determination is below a threshold. By way of another example, data may be ignored if a difference between the sensor data (e.g., pressure or temperature) and a baseline value meets or exceeds a threshold. Further, data associated with a group can be omitted for the purposes of determining a metric if the number of data points associated with the group is below a threshold number, if the slope meets or exceeds a threshold value, if the standard deviation of a group meets or exceeds a threshold value, and the like.

At operation 414, the process can include determining a difference over time. As discussed herein, the techniques can include determining metrics or groups of data (or a plurality of data, a subset of data, and the like). Metrics over time can be compared to a baseline metric to determine trends, relative differences, or a magnitude of a difference. A difference between metrics meeting or exceeding a threshold value may suggest that a barometer sensor is miscalibrated.

Accordingly, at operation 416, the techniques can include determining calibration data based on the difference. For example, a difference between metrics can represent calibration data, such as an offset, to calibrate subsequent sensor data. When the UE captures barometer sensor data, the calibration data can be applied to the data to provide more accurate data, which can ultimately result in more a more accurate determination of an elevation of the UE.

In some examples, the calibration data can include an offset to adjust captured barometer sensor data associated with particular environmental conditions such as pressure, temperature, humidity, and the like. In some examples, the operation 416 can include determining a calibration curve to interpolate between different calibration data points and/or to extrapolate beyond captured data. In some examples the operation 416 can include generating, storing, or otherwise determining a lookup table (or other data structure) including calibration data indexed by pressure, temperature, and the like. In some examples, the operation 416 can include training or otherwise determining a machine learned model to output calibration data or calibrated sensor data.

In some examples, the some or all of the process 400 can be repeated after a calibration process is completed to monitor or otherwise calibrate a barometer sensor of a UE.

FIG. 5 illustrates an example process 500 for determining an elevation of a UE based on calibration data and sensor data captured by a barometer sensor. The example process 500 can be performed (at least in part) by the UEs 102 and/or 300, or by any device calibrated in accordance with the techniques discussed herein.

At operation 502, the process can include receiving a request for elevation data. In some examples, the request may be received from internal processes of the UE during a call procedure to a Public Safety Answering Point (PSAP). In some examples, the request may be received from an application or routine of the UE for determining location, and the process is not limited to communication with a PSAP. For example, the process 500 can be used in conjunction with determining a location of the UE in an environment generally, and the process 500 can be but one of the inputs to a location determination. In some examples, a location of the UE can be determined based at least in part on GPS data, beamforming data, timing advance data, and the like.

At operation 504, the process can include receiving sensor data from a barometer. In particular, the operation 504 can include capturing sensor data or generating sensor data using a sensor of the UE.

At operation 506, the process can include accessing calibration data. In some examples, the calibration data may be stored in memory of the UE as a lookup table, a calibration curve, a machine learned model, and the like.

At operation 508, the process can include determining the elevation data based at least in part on the sensor data and the calibration data. For example, the operation 508 can include determining an offset or correction factor and applying the offset or correction factor to the sensor data to determine calibrated sensor data. In some cases, the offset or correction factor may increase or decrease the captured sensor data, or may not change the captured sensor data.

At operation 510, the process can include sending the elevation data at least partially in response to the request. In some examples, the operation 510 can include sending the elevation as part of a communication to a PSAP. In some examples, the operation 510 can include sending the elevation data to an application or process running on the UE for further processing, such as to integrate with other sensor data when determining a location of the UE in an environment.

CONCLUSION

Although features and/or methodological acts are described above, it is to be understood that the appended claims are not necessarily limited to those features or acts. Rather, the features and acts described above are disclosed as example forms of implementing the claims.

What is claimed is:
1. A method comprising:
determining a location for calibrating a barometer sensor of a user equipment (UE);
determining, at a first time, first barometer data, wherein the first barometer data is one of a plurality of first barometer data associated with a first period of time;
determining, at a second time after the first time, that the UE is at the location;
determining, at the second time, second barometer data, wherein the second barometer data is one of a plurality of second barometer data associated with a second period of time that is different than the first period of time;
determining a first metric associated with the plurality of first barometer data;
determining a second metric associated with the plurality of second barometer data;
determining a difference between the first metric and the second metric;
determining calibration data for the barometer sensor based at least in part on the difference;
determining, at a third time after the second time, that the UE is not at the location; and
determining, based at least in part on the UE not being at the location, to refrain from capturing third barometer sensor data.

2. The method of claim 1, wherein the calibration data comprises an offset for adjusting fourth barometer data captured at a fourth time after the second time.

3. The method of claim 1, further comprising:
determining the location based at least in part on a wireless connection with a base station and a time of day.

4. The method of claim 3, further comprising:
determining the base station based at least in part on an indication received from a user interface of the UE.

5. The method of claim 1, further comprising:
determining the location based at least in part on a machine learned model.

6. The method of claim 1, wherein the first metric comprises at least one of an average value of the plurality of first barometer data or a difference between a maximum value of the plurality of first barometer data and a minimum value of the plurality of first barometer data.

7. The method of claim 1, further comprising:
determining, based at least in part on the calibration data, that the UE is associated with an accuracy of +/−36 Pascals.

8. A system comprising:
one or more processors; and
one or more non-transitory computer-readable media storing computer-executable instructions that, when executed, cause the one or more processors to perform operations comprising:
determining a location for calibrating a barometer sensor of a user equipment (UE);
determining, at a first time, first barometer data, wherein the first barometer data is one of a plurality of first barometer data associated with a first period of time;
determining, as first data, that the UE is connected to a known base station;
determining, as second data, a second time after the first time;
determining, a third data, a temperature;
determining, as fourth data, accelerometer data of the UE;
inputting the first data, the second data, the third data, and the fourth data to a machine learned model;
receiving, from the machine learned model, an indication that the UE is at the location
based on receiving the indication, determining, at the second time, that the UE is at the location;
determining, at the second time, second barometer data, wherein the second barometer data is one of a plurality of second barometer data associated with a second period of time that is different than the first period of time;
determining a first metric associated with the plurality of first barometer data;
determining a second metric associated with the plurality of second barometer data;
determining a difference between the first metric and the second metric; and
determining calibration data for the barometer sensor based at least in part on the difference.

9. The system of claim 8, wherein the calibration data comprises an offset for adjusting third barometer data captured at a third time after the second time.

10. The system of claim 8, the operations further comprising:
determining the location based at least in part on a wireless connection with a base station and a time of day.

11. The system of claim 8, the operations further comprising:
determining, at a third time after the second time, that the UE is not at the location; and
determining, based at least in part on the UE not being at the location, to refrain from capturing third barometer sensor data.

12. The system of claim 8, wherein the first metric comprises at least one of:
an average value of the plurality of first barometer data; or
a difference between a maximum value of the plurality of first barometer data and a minimum value of the plurality of first barometer data.

13. The system of claim 8, wherein the second period of time is separated from the first period of time based at least in part on a predetermined period of time.

14. One or more non-transitory computer-readable media storing computer-executable instructions that, when executed, cause one or more processors to perform operations comprising:
determining a location for calibrating a barometer sensor of a user equipment (UE);
determining, at a first time, first barometer data, wherein the first barometer data is one of a plurality of first barometer data associated with a first period of time;
determining, at a second time after the first time, that the UE is at the location;
determining, at the second time, second barometer data, wherein the second barometer data is one of a plurality of second barometer data associated with a second period of time that is different than the first period of time;
determining a first metric associated with the plurality of first barometer data;
determining a second metric associated with the plurality of second barometer data;
determining a difference between the first metric and the second metric;
determining calibration data for the barometer sensor based at least in part on the difference;
determining, at a third time after the second time, that the UE is not at the location; and
determining, based at least in part on the UE not being at the location, to refrain from capturing third barometer sensor data.

15. The one or more non-transitory computer-readable media of claim 14, wherein the calibration data comprises an offset for adjusting fourth barometer data captured at a fourth time after the second time.

16. The one or more non-transitory computer-readable media of claim 15, the operations further comprising at least one of:
- determining the location based at least in part on a wireless connection with a base station and a time of day; or
- determining the location based at least in part on a machine learned model.

17. The one or more non-transitory computer-readable media of claim 14, wherein the first metric comprises at least one of:
- an average value of the plurality of first barometer data; or
- a difference between a maximum value of the plurality of first barometer data and a minimum value of the plurality of first barometer data.

* * * * *